(12) United States Patent
Ottieri et al.

(10) Patent No.: US 11,947,585 B2
(45) Date of Patent: Apr. 2, 2024

(54) CONTACTLESS CARD FOR MULTIMEDIA APPLICATIONS, MULTIMEDIA FILE CONFIGURATION AND MULTIMEDIA FILE PLAYBACK

(71) Applicant: 3V AGENCY S.R.L., Milan (IT)

(72) Inventors: Ciro Alessandro Ottieri, Modena (IT); Aris Giavelli, Sassuolo (IT)

(73) Assignee: 3V AGENCY S.R.L., Milan (IT)

( * ) Notice: Subject to any disclaimer, the term of this patent is extended or adjusted under 35 U.S.C. 154(b) by 59 days.

(21) Appl. No.: 17/763,549

(22) PCT Filed: Sep. 30, 2020

(86) PCT No.: PCT/IB2020/059143
§ 371 (c)(1),
(2) Date: Mar. 24, 2022

(87) PCT Pub. No.: WO2021/064588
PCT Pub. Date: Apr. 8, 2021

(65) Prior Publication Data
US 2022/0405318 A1 Dec. 22, 2022

(30) Foreign Application Priority Data

Sep. 30, 2019 (IT) .......................... 202019000003371
Sep. 29, 2020 (IT) .......................... 102020000022987

(51) Int. Cl.
*G06F 16/432* (2019.01)
*G06F 16/955* (2019.01)
*G06K 7/14* (2006.01)

(52) U.S. Cl.
CPC ........ *G06F 16/434* (2019.01); *G06F 16/9554* (2019.01); *G06K 7/1417* (2013.01)

(58) Field of Classification Search
CPC ... H04W 4/80; G06K 19/0723; G06K 7/1417; G06K 19/06037; G06K 19/06028; G06K 7/10297
See application file for complete search history.

(56) References Cited

U.S. PATENT DOCUMENTS

| 2009/0108057 | A1 | 4/2009 | Mu et al. |
| 2013/0018726 | A1 | 1/2013 | Ionescu et al. |
| 2013/0037606 | A1 | 2/2013 | Murdoch |
| 2013/0290326 | A1 | 10/2013 | Lebedev |
| 2013/0314214 | A1* | 11/2013 | Leica ...................... H04W 4/80 340/10.1 |
| 2014/0113549 | A1 | 4/2014 | Beg et al. |

OTHER PUBLICATIONS

International Search Report and Written Opinion for International PCT Application No. PCT/IB2020/059143 filed on Sep. 30, 2020, on behalf of 3V Agency S.R.L. dated Jan. 20, 2021. 13 Pages.

* cited by examiner

*Primary Examiner* — Hau H Hoang
(74) *Attorney, Agent, or Firm* — Steinfl + Bruno LLP

(57) ABSTRACT

A device with an identifier is described. The identifier includes a complete link for access to a digital playback platform of a multimedia file. The identifier is a readable identifier including a near-field communication (NFC) transceiver module, a QR code, or a barcode. Multimedia file configuration and multimedia file playback methods and systems on the digital playback platform are also described.

22 Claims, 4 Drawing Sheets

CONTACTLESS CARD FOR MULTIMEDIA APPLICATIONS, MULTIMEDIA FILE CONFIGURATION AND MULTIMEDIA FILE PLAYBACK

CROSS REFERENCE TO RELATED APPLICATIONS

The present application is the U.S. National Stage of International Patent Application No. PCT/IB2020/059143 filed on Sep. 30, 2020 which, in turn, claims priority to Italian Application No. 202019000003371 filed on Sep. 30, 2019 and Italian Application No. 102020000022987 filed on Sep. 29, 2020.

FIELD OF APPLICATION

The present invention also relates to a contactless card for multimedia applications.

The present invention further relates to multimedia file configuration on a digital platform for a playback thereof.

The present invention further relates to multimedia file playback.

In particular, the present invention relates to the playback of multimedia files to facilitate the consumption and playback of music and multimedia content on digital platforms.

PRIOR ART

To date, it is possible to start playing back a multimedia content and in particular a musical song in different modes:
 by means of CD, record, DVD, audio cassette, etc.
 by means of text search on smartphones
 by means of the voice assistant of a hardware device
These modes have a number of drawbacks.

It is known, for example, that to start a song using a CD or traditional physical medium, a series of sequential actions must be carried out, such as opening the player, inserting the medium, choosing the song, etc., which make the operation quite slow.

In addition, a CD is a medium which can scratch and deteriorate over time, becoming unusable, and simultaneously not updatable over time; furthermore, the CD is a medium which is now poorly compatible with most of everyday's applications so, for example, car radios or modern PCs/NBs no longer include CD players.

On the other hand, it is known that multiple selections are required to carry out a text search or search by means of voice assistant before reaching the song to be played.

The object of the present invention is to provide a multimedia file configuration and/or playback tool, system and method which is efficient in terms of playback start times.

Another object of the present invention is to obtain a non-complex multimedia file configuration and/or playback tool, system and method.

A further object of the present invention is to obtain a simple to use multimedia file configuration and/or playback tool, system and method.

SUMMARY OF THE INVENTION

In a first aspect, the invention describes a primary device, in particular a card as described in claim 1.

Advantageous aspects are described in dependent claims 2 and 3.

In a second aspect, the invention describes a base multimedia file playback system, according to what is described in claim 4.

Advantageous aspects are described in dependent claim 5.

In a third aspect, the invention describes a multimedia file access configuration method, according to what is described in claim 6.

Advantageous aspects are described in dependent claims 7-10.

In a fourth aspect, the invention describes a multimedia file access configuration system, according to what is described in claim 11.

Advantageous aspects are described in dependent claims 12 to 15.

In a fifth aspect, the invention describes an advanced multimedia file playback method, according to what is described in claim 16.

Advantageous aspects are described in dependent claims 17 to 18.

In a sixth aspect, the invention describes an advanced multimedia file playback system, according to what is described in claim 19.

Advantageous aspects are described in dependent claims 20 to 21.

The present invention relates to the playback of multimedia files, for example on music streaming platforms such as Spotify, YouTube, iTunes, Apple Music, Amazon Music, Deezer.

The present invention therefore aims to facilitate the consumption and playback of music and multimedia content, in particular audio-video, on digital platforms by providing users with an easier and faster start-up process from the primary device to the second device which plays back the content without requiring a direct contact between the two devices.

In a base formulation thereof, the invention provides a card as primary device

The interaction between the primary device and a second device, i.e., the hardware which will playback the content, can occur with different technologies such as, for example, NFC technology or the use of the camera of the second device.

An example of an application of the invention is the start of the playback of a song by means of simple interaction gestures with an electronic device, such as placing a card on a smartphone.

In one example, the card sends a signal to a suitable hardware on the second device, by means of NFC technology, or to a camera installed on the second device on which the content is subsequently played back.

The second device, i.e., a hardware device capable of recognizing one of the technologies used by the first device, is arranged to receive the necessary input from the first device itself and starts, i.e., plays back the content on a target digital platform.

In the more general formulation thereof, the present invention proposes a solution capable of simultaneously accelerating the diffusion of the use of streaming platforms and stimulating the physical media market again. The invention represents a quick and simple connection between a physical device and an electronic device capable of playing back the multimedia content via a contactless mode.

Just like the most modern credit cards allow to make a payment by approaching them to a POS capable of reading such cards, so the invention allows to start the playback of the multimedia content, in particular audio-video, for example a song or a video clip, on another electronic device such as a smartphone or another device capable of receiving input from one of the technologies used in the invention.

The content playback process is structured as follows: the user places the invention near an electronic device capable of receiving the input and the electronic device performs the target action, such as starting the playback of a song on the Spotify application using NFC technology or the barcode of the streaming platform.

The same playback process applies to streaming platforms such as Spotify, Amazon Music or YouTube.

The primary device is preferably a card preferably obtained as a physical medium in PVC with an NFC chip or/and a QR code printed on the medium itself The interaction with an electronic reading device, for example a smartphone, takes place by means of an NFC reader or a camera, through which the target operation is started (e.g., playback of a song on Spotify). In another example, the electronic reading device is a "jukebox" or a "speaker" with NFC reader which reads from the primary device, i.e., preferably a physical medium such as a PVC card with NFC chip.

The invention achieves the following technical effects:
arrangement of an instantaneous means to make multimedia content usable
instantaneous target content playback;
target content playback achievable without the need to carry out complex actions;
editable playback over time; different multimedia content can be played back sequentially in reduced times;
ease of transport.

The technical effects/advantages mentioned, and other technical effects/advantages of the invention, will emerge in further detail from the description provided herein below of an example embodiment provided by way of approximate and non-limiting example with reference to the appended drawings.

DETAILED DESCRIPTION

The invention describes a primary device comprising identification means comprising a complete link for accessing a playback platform of a multimedia file, in which the identification means comprises one of a transceiver module with NFC technology, a QR code, a barcode, or the like.

The invention further describes multimedia file configuration and multimedia file playback methods and systems on a digital playback platform.

With particular reference to FIGS. 1-4, a primary device 10 is shown.

In an embodiment of the invention, the primary device 10 is one of a magnetic card, a microprocessor card, or the like.

Figure 4:
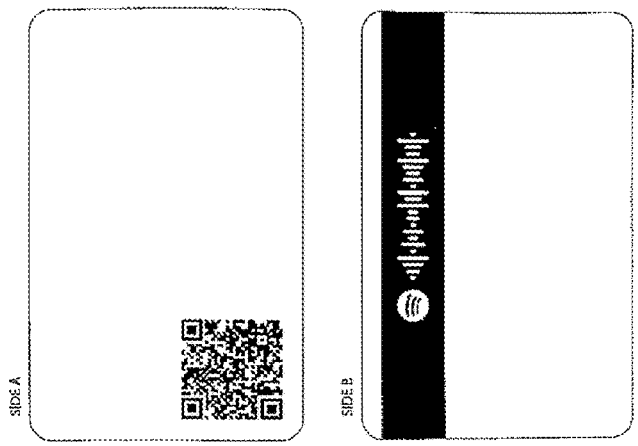
FIGS. 1 to 4 are schematic views of a primary device, in particular a contactless card, according to the invention.
Figure 2:
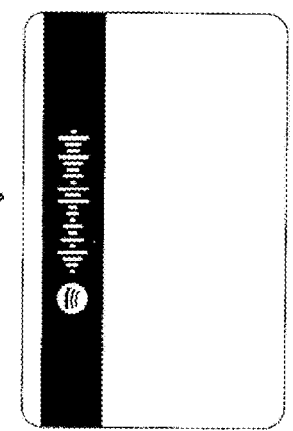
Figure 3:
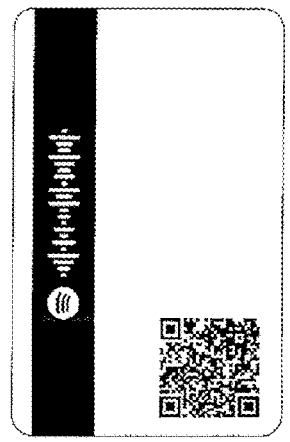
Figure 1:
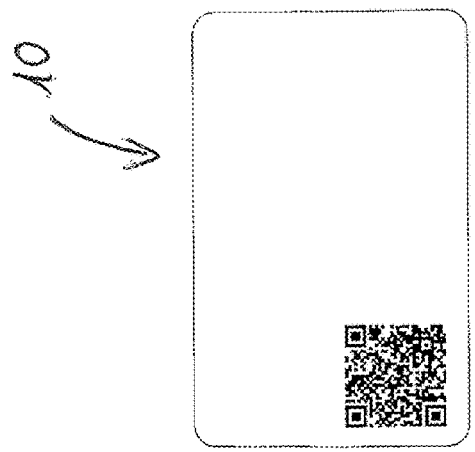
Figure 7:
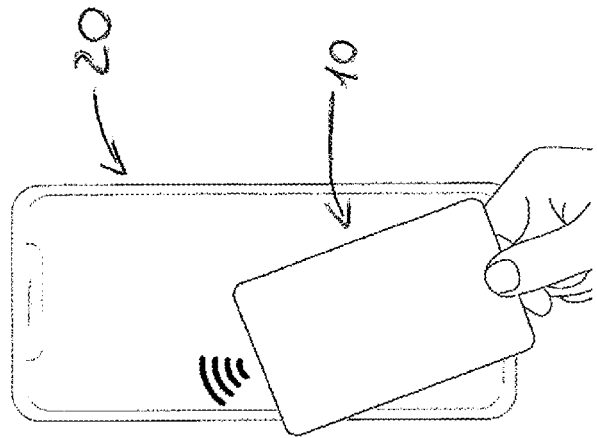
FIGS. 5 to 7 show an interaction between the primary device and a second device arranged for a reading from the primary device, according to the invention.
Figure 5:
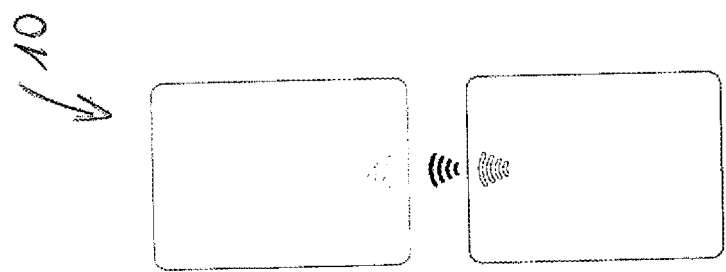
Figure 6:
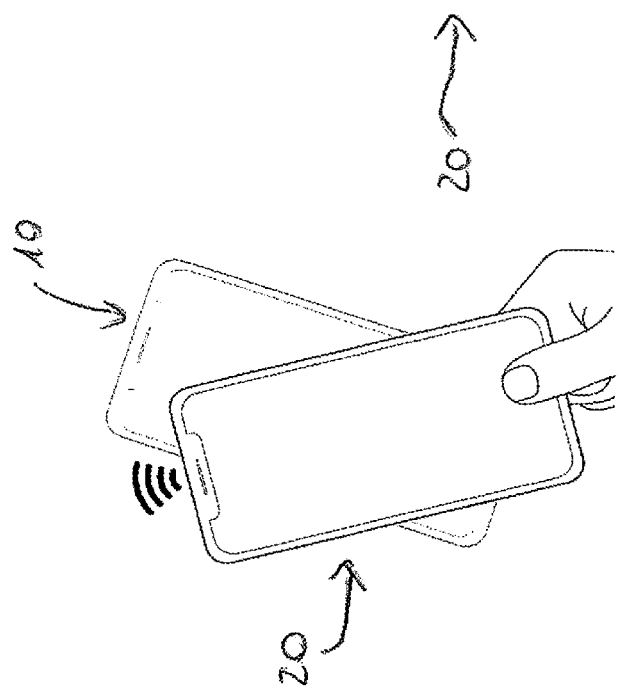
Figure 8:
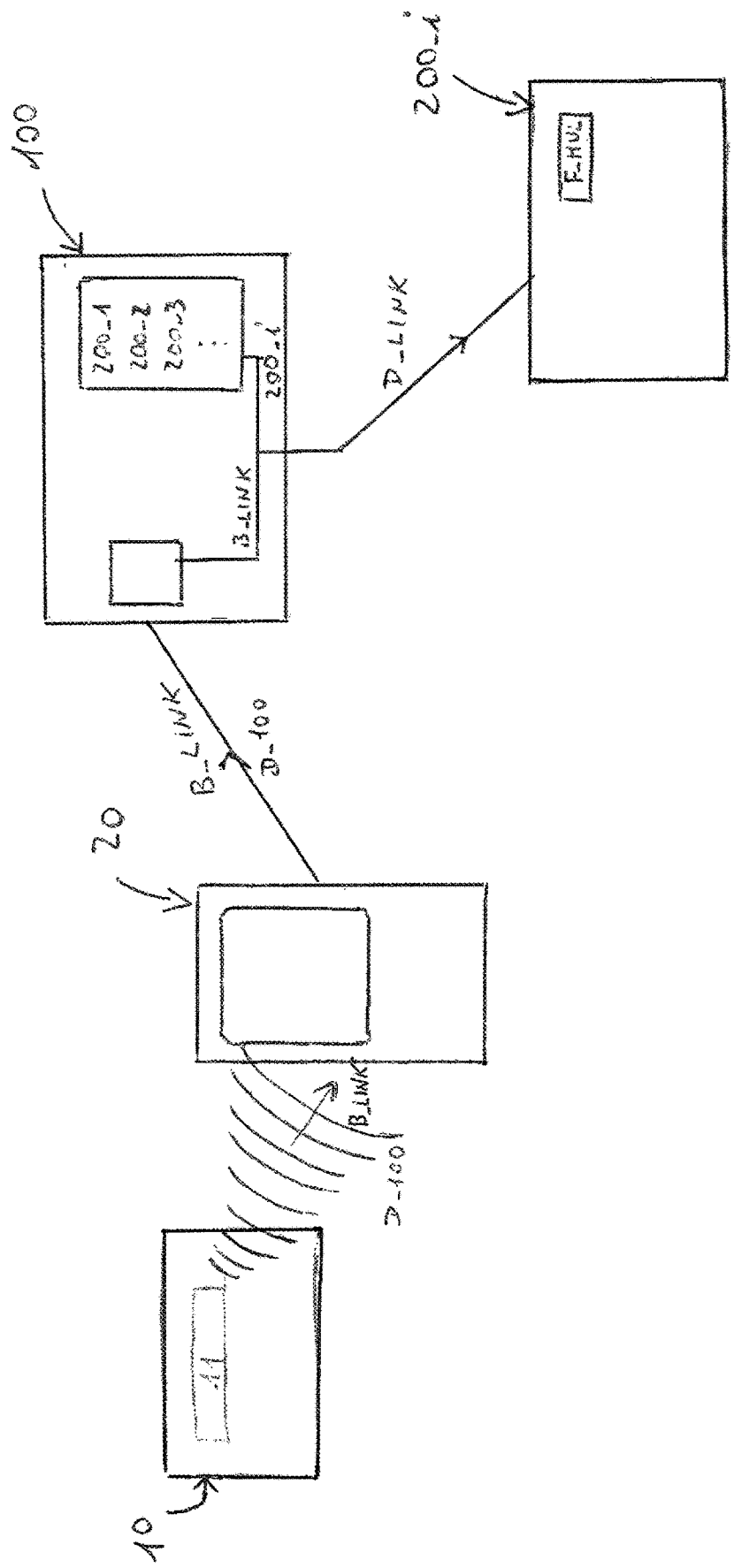
FIG. 8 shows a multimedia file configuration method/system according to the invention.
Figure 9:
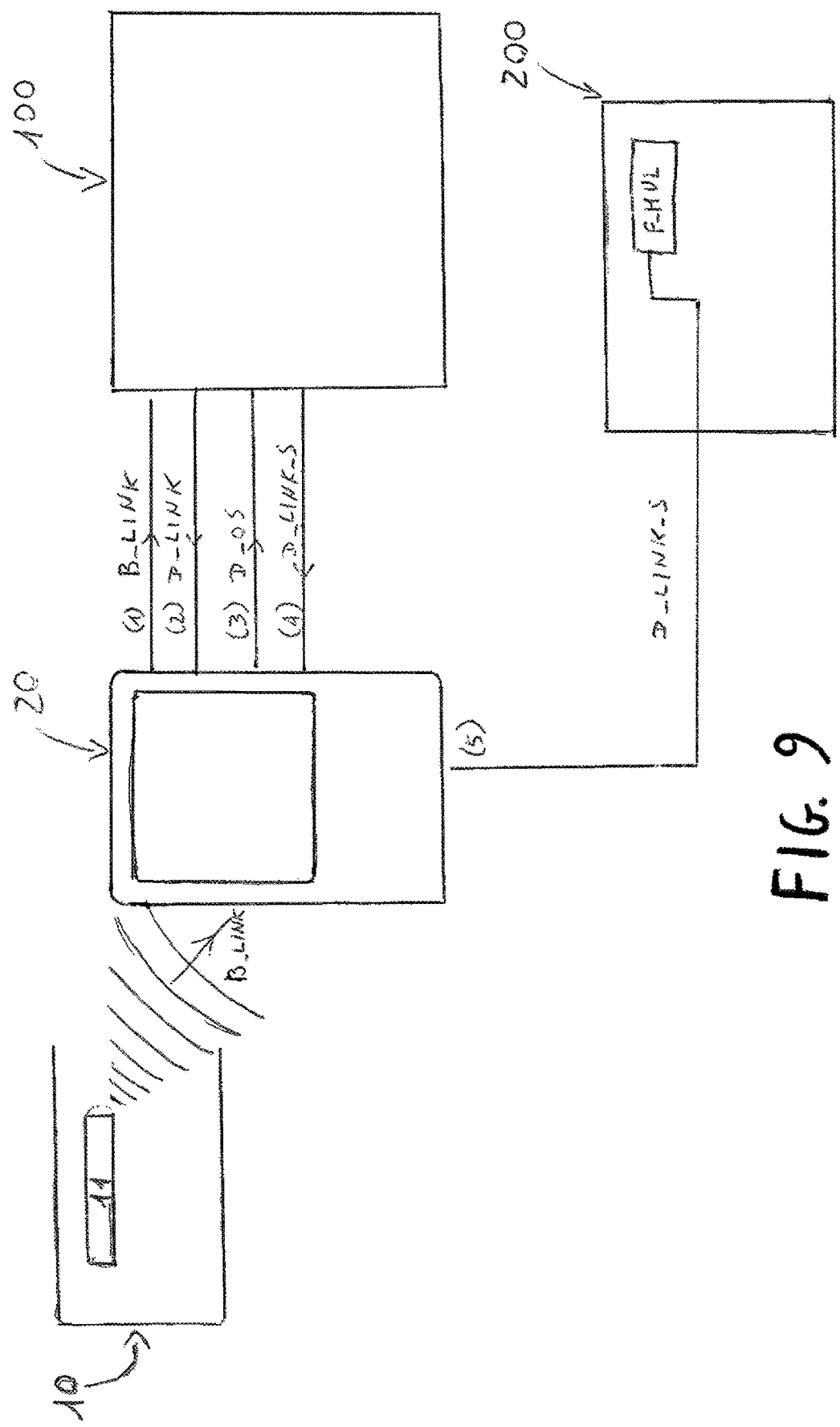
FIG. 9 shows a multimedia file playback method/system, according to the invention

In another embodiment of the invention, the primary device 10 is an electronic device comprising one of a smartphone, a PC tablet, or the like. With particular reference to FIG. 8 or 9, according to the invention, the primary device 10 comprising identification means 11 comprising a complete link D_Link for access to a playback platform 200_i of a multimedia file F_mul.

In particular, the complete link D_Link allows a direct access to the multimedia file F_mul on the multimedia playback platform 200_i.

The identification means 11 comprises one of a transceiver module with NFC technology, a QR code, a barcode, or the like.

The invention embodies in an aspect thereof, a base playback system of a multimedia file F_Mul comprising the primary device 10 and a secondary electronic device 20, shown in the figures, arranged to read, in contactless mode, the identification means 11 from the primary device 10.

The secondary electronic device 20, according to the invention, comprises an electronic device among a smartphone, a PC tablet, or the like.

According to the invention, the secondary electronic device 20 comprises one of a short-range radio frequency reader, in particular NFC, or QR code reader, or barcode reader or the like, or a camera, arranged to read the identification means 11 from the primary device 10.

According to the invention, the reading of the identification means 11 redirects the secondary electronic device 20, by means of the complete link D_Link, to a playback platform 200_i (FIGS. 8 and 9) of the multimedia file F_mul.

The secondary electronic device 20 is arranged to playback the multimedia file F_mul corresponding to the complete link D_Link.

In an aspect thereof, the invention describes an advanced playback system of multimedia files (F_mul).

This system is used by the end user who wants to listen to a content by a content creator, in particular a song by an artist, who has made it available in the manner described below.

The system according to the invention comprises the primary device 10.

In an embodiment, the primary device 10 comprises identification means 11 of a base link B_Link for accessing a playback platform 200_i of a multimedia file F_mul, as shown in FIG. 9.

Preferably, the playback platform 200_i comprises one of, at least, Spotify, YouTube, iTunes, Apple Music, Amazon Music, Deezer, Pandora.

The system further comprises the secondary electronic device 20 for accessing a multimedia file F_mul.

The secondary electronic device 20 is arranged to read, in contactless mode, the identification means 11.

In a first embodiment of the invention the primary device 10 is associated with access data D_100 for an access to the configuration software platform 100 by the content creator and the access to the configuration software platform 100 can be carried out by any suitable electronic device.

In a second embodiment of the invention, the reading of the identification means 11 redirects said device, by means of the aforementioned base link B_Link, to a configuration software platform 100.

In general, the configuration software platform 100, according to the invention, allows a developer, or the artist who requested access thereto, to redirect from the main link or base link to the target link or action which allows the immediate playback of the multimedia file F_mul.

The target actions can be, for example:
opening a song on Spotify or on another music streaming platform;
opening a video on YouTube or on another video streaming platform;
opening a social channel or other web page.

By means of the proprietary configuration software platform 100 it is possible to choose to implement specific "deeplinks" related to the individual platforms as redirect destinations.

According to the invention, the configuration software platform 100 returns to said secondary electronic device 20 a complete link D_Link stored on the configuration software platform 100 and generated as a function of the base link B_Link.

The secondary electronic device 20 is arranged to receive the complete link D_Link, and in response to receiving the complete link D_Link, send to the configuration software platform 100 data D_OS representative of the operating system OS installed on the secondary electronic device 20.

The configuration software platform 100 is configured to receive the data D_OS representative of the operating system OS and define a specific deep link D_Link_S for the multimedia file F_mul for an access by the secondary electronic device 20 operating with the operating system OS specified by said data D_OS.

In other words, once a "deeplink" is started/activated, the system analyses the hardware device and understands the type thereof (e.g., iOS, Android, etc.). Depending on this type, the specific action of the single software operating system is performed and consequently the application or target destination is opened.

For example, by approaching the invention to an Android smartphone, the software, by means of the link, understands that it is an Android and initiates the opening of the apk of the target app (e.g., Spotify) and not simply the opening of a web page. On the contrary, if it had been read by an iPhone, the app would have been launched by means of a "different trigger".

The secondary device (20) is further arranged to access the specific deep link D_Link_S and playback the multimedia file F_mul corresponding to said specific deep link D_Link_S.

According to the invention, the specific deep link D_Link_S is set based on the playback platform 200_i on which the multimedia file F_Mul is to be played back.

In other words, to access one of, at least, Spotify, YouTube, iTunes, Apple Music, Amazon Music, Deezer, a specific deeplink will be set.

For example, for Spotify, the deeplink is created by entering the spotify URI of the track or playlist.

An alphanumeric name is also added, which will complete the url (so that it is unique and SEO friendly), as well as a multimedia content image, for example to be used as a cover and background.

The url of the deeplink retrieves all the parameters entered during creation.

The page contains a script which starts the redirect process using the spotify URI.

There is also a server-side control (php) which verifies the type of device through the user agent, whether it is a desktop or mobile device; in the case of a mobile device, an additional control verifies if it is an Android or Apple device, since the intents for opening the application differ from each other.

As soon as the page loads, a timeout starts which within 2 seconds starts the redirect by means of spotify URI, both for desktop and mobile device.

For the mobile device, if the Spotify app is installed, the redirect starts the application and plays the song automatically; an attempt is made to open the spotify uri by treating it as a link, both on Android and on iOS.

If the app is not present, the user is redirected to the spotify web player. With regard to desktop, the operation is similar: if the spotify app is installed, the program is started on the song in question.

Otherwise, it is redirected to the spotify web player.

In one aspect thereof, the invention also relates to an advanced multimedia file playback method comprising the features associated with the components of the advanced multimedia file playback system described.

In another aspect, the invention refers to an access configuration system to multimedia files F_mul, as shown in FIG. 8.

This system is exploited by the content creator, for example an artist who wants his content to be played back, his song to be listened to, and therefore wants to make the content available for playback.

The system comprises the primary device 10 already described.

The system further comprises the secondary electronic device (20).

The system further comprises the configuration software platform 100 arranged for an access configuration to the multimedia file F_Mul.

In one embodiment, the primary device 10 is associated with access data D_100 for an access to the configuration software platform 100 and the access to the configuration software platform 100 by means of the secondary electronic device 20 occurs based on the access data D_100. According to the invention, the secondary electronic device (20) is arranged to read, in contactless mode, the identification means 11 on the primary device 10 to obtain the base link B_Link.

In a first embodiment of the invention the primary device 10 is associated with access data D_100 for an access to the configuration software platform 100 by the content creator and the access to the configuration software platform 100 can be carried out by any suitable electronic device. In a second embodiment of the invention, the secondary electronic device 20 is further arranged to access the configuration software platform 100 and, on the configuration software platform 100, select a digital playback platform 200_i.

According to the invention, the digital playback platform 200_i is directed starting from the base link B_Link read and is configured to make the multimedia file F_mul available for playback.

The configuration software platform 100, according to the invention, is configured to generate a complete link D_Link as a function of the base link B_Link and the selected digital playback platform 200_i. The technical effect achieved is that access to a web location by means of the complete link D_Link allows an immediate playback of the multimedia file F_mul.

The software platform 100 stores the complete link D_Link.

In one aspect thereof, the invention also relates to a multimedia file access configuration method comprising the features associated with the components of the multimedia file access configuration system described. A primary device was described comprising identification means comprising a complete link for accessing a playback platform of a multimedia file, in which the identification means comprise one of a transceiver module with NFC technology, a QR code, a barcode, or the like.

Multimedia file configuration and multimedia file playback methods and systems on a digital playback platform were also described.

The invention achieves the following technical effects:

arrangement of an instantaneous means to make multimedia content usable instantaneous target content playback;

target content playback achievable without the need to carry out complex actions;

editable playback over time; different multimedia content can be played back sequentially in reduced times;

ease of transport.

The invention claimed is:

1. An access configuration method to multimedia files, comprising the steps of:
   providing a primary device comprising an identifier, the identifier including a complete link for direct remote access to a multimedia file in a playback platform of multimedia files, wherein the identifier is a readable identifier comprising a near-field communication (NFC) transceiver module, a QR code, or a barcode, the identifier of the primary device being a readable identifier of a base link for access to a digital playback platform of a multimedia file;
   providing a configuration software platform to configure the primary device;
   providing a secondary electronic device;
   reading, in contactless mode, by the secondary electronic device the readable identifier on the primary device to obtain the base link;
   accessing the configuration software platform;
   on the configuration software platform, selecting a digital playback platform indexed starting from the base link read by the secondary electronic device, the digital playback platform configured to provide availability of the multimedia file for playback;
   generating a complete link on the configuration software platform as a function of the base link and the selected digital playback platform, wherein the complete link allows an immediate playback of the multimedia file; and
   storing on the configuration software platform the complete link.

2. The method according to claim 1, wherein the step of accessing the configuration software platform is performed by the secondary electronic device or by a different electronic device.

3. The method according to claim 1, wherein the primary device is associated with access data for an access to the configuration software platform, wherein the access to the configuration software platform occurs based on the access data.

4. The method according to claim 1, wherein the secondary electronic device comprises one of a short-range radio frequency reader or a camera, arranged to read the readable identifier from the primary device.

5. The method according to claim 1, wherein the secondary electronic device is a smartphone or a PC tablet.

6. The method according to claim 1, wherein the primary device is a magnetic card or a microprocessor card.

7. The method according to claim 1, wherein the primary device comprises an electronic device, the electronic device including a smartphone or a PC tablet.

8. An access configuration system to multimedia files, comprising:
   a primary device comprising an identifier, the identifier including a complete link for direct remote access to a multimedia file in a playback platform of multimedia files, wherein the identifier is a readable identifier comprising a near-field communication (NFC) transceiver module, a QR code, or a barcode, the identifier of the primary device being a readable identifier of a base link for access to a digital playback platform of a multimedia file; and
   a configuration software platform arranged for an accessing configuration to access the multimedia file,
   wherein the configuration software platform is configured to:
   generate a complete link as a function of the base link and a selected digital playback platform, wherein access to a web location by the complete link allows an immediate playback of the multimedia file; and
   store the complete link on the configuration software platform.

9. The system according to claim 8, further comprising a secondary electronic device configured for:
   reading, in contactless mode, the readable identifier on the primary device to obtain the base link;
   accessing the configuration software platform; and
   on the configuration software platform, selecting the digital playback platform indexed starting from the base link read by the secondary electronic device, the digital playback platform configured to provide availability of the multimedia file for playback.

10. The system according to claim 8, wherein the primary device is associated with access data for an access to the configuration software platform, wherein the access to the configuration software platform occurs based on the access data.

11. The system according to claim 9, wherein the secondary electronic device comprises one of a short-range radio frequency reader or a camera, arranged to read the readable identifier from the primary device.

12. The system according to claim 9, wherein the secondary electronic device is a smartphone or PC tablet.

13. The system according to claim 8, wherein the primary device is a magnetic card or a microprocessor card.

14. The system according to claim 8, wherein the primary device comprises an electronic device, the electronic device including a smartphone or a PC tablet.

15. A playback method of multimedia files, comprising the steps of:
   providing a primary device comprising an identifier, the identifier including a complete link for direct remote access to a multimedia file in a playback platform of multimedia files, wherein the identifier is a readable identifier comprising a near-field communication (NFC) transceiver module, a QR code, or a barcode, the identifier of the primary device being a readable identifier of a base link for access to a playback platform of a multimedia file;
   providing a secondary electronic device for access to the multimedia file;
   reading the readable identifier, in contactless mode, by the secondary electronic device, wherein the reading redirects, by the base link, to a configuration software platform;
   returning to the secondary electronic device, by the configuration software platform, a complete link stored on the configuration software platform and generated as a function of the base link;
   upon receipt, by the secondary electronic device, of the complete link, sending to the configuration software platform, by the secondary electronic device, data representative of an operating system installed on the secondary electronic device;

upon receipt, by the configuration software platform, of the data representative of the operating system, defining a specific deep link for the multimedia file for an access by the secondary electronic device;

accessing the specific deep link by the secondary electronic device; and playing back, on the secondary electronic device, the multimedia file corresponding to the specific deep link.

16. The method according to claim 15, wherein the specific deep link is based on the playback platform on which the multimedia file is to be played back.

17. The playback method according to claim 15, wherein the primary device is a magnetic card or a microprocessor card.

18. The playback method according to claim 15, wherein the primary device comprises an electronic device, the electronic device including a smartphone or a PC tablet.

19. A playback system of multimedia files, comprising:
a primary device comprising an identifier, the identifier including a complete link for direct remote access to a multimedia file in a playback platform of multimedia files, wherein the identifier is a readable identifier comprising a near-field communication (NFC) transceiver module, a QR code, or a barcode, the identifier of the primary device being a readable identifier of a base link for access to a playback platform of a multimedia file; and a secondary electronic device configured to read, in contactless mode, the readable identifier, wherein reading of the readable identifier redirects, by the base link, to a configuration software platform, wherein
i) the configuration software platform is configured to return to the secondary electronic device a complete link stored on the configuration software platform, the complete link generated as a function of the base link;
ii) the secondary electronic device is configured to:
receive the complete link, and
upon receiving the complete link, send to the configuration software platform data representative of an operating system installed on the secondary device;
iii) the configuration software platform is further configured to:
receive the data representative of the operating system, and
define a specific deep link for the multimedia file for an access by the secondary electronic device operating with the operating system specified by the data;
iv) wherein the secondary electronic device is further configured to:
access the specific deep link, and
play back the multimedia file corresponding to the specific deep link.

20. The system according to claim 19, wherein the specific deep link is based on the playback platform on which the multimedia file is to be played back.

21. The system according to claim 19, wherein the primary device is a magnetic card or a microprocessor card.

22. The system according to claim 19, wherein the primary device comprises an electronic device, the electronic device including a smartphone or a PC tablet.

* * * * *